United States Patent [19]

Hillborg

[11] 3,902,182
[45] Aug. 26, 1975

[54] PROCESS AND DEVICE FOR DETERMINING PHOTOGRAPHICALLY DIMENSIONS OF PERSONS AND OBJECTS

[76] Inventor: Lars Evert Bernhard Hillborg, Sodra Langgatan 36, S-171 49 Solna, Sweden

[22] Filed: Oct. 18, 1973

[21] Appl. No.: 407,490

[52] U.S. Cl. ................ 354/105; 33/17; 346/107
[51] Int. Cl.² ........................................ G03B 17/24
[58] Field of Search ........................ 95/1.1; 33/17

[56] References Cited
UNITED STATES PATENTS

| | | | |
|---|---|---|---|
| 1,669,407 | 5/1928 | Artigue | 352/88 |
| 1,937,433 | 11/1933 | Moe | 33/17 |

Primary Examiner—John M. Horan
Attorney, Agent, or Firm—Cushman, Darby & Cushman

[57] ABSTRACT

The invention relates to photographing of objects or persons for measuring purposes by placing the object or person between the camera and a screen or wall provided with grids or scales and the camera. The division of the screen is marked in values of unit lengths such as centimeters and decimeters and is such that the ratio between the divisions and a corresponding true unit length is equal to the ratio between the distance of the camera from the screen and the distance of the camera from the object so that the photographed values of units shown by the photographed image are true values free from parallax.

1 Claim, 7 Drawing Figures

PROCESS AND DEVICE FOR DETERMINING PHOTOGRAPHICALLY DIMENSIONS OF PERSONS AND OBJECTS

The invention relates to a process and a device for producing images of objects or persons, provided with grids or scales for measuring purposes, in which the object when photographed is placed between a camera and a flat surface (screen) provided with grids or scales. Processes and devices of this type are well known in the art and are used, among other things, for measuring in tailor shops and for making bases for sculptures. The process and device according to the invention are mainly intended to be used in, for example, keeping journals and in instruction in health care, but they can also be used in other areas, e.g., those mentioned above.

The known processes and devices have a number of disadvantages, such as insufficient accuracy, great time consumption and a demand for professionally trained personnel. In the process disclosed in German Patent Specification No. 624,560 the person to be measured is photographed together with a staff or the like of known length in the same plane perpendicular to the optical axis of the camera. The staff serves as a measuring reference. The picture obtained is then projected on a grid, the degree of enlargement being determined so that the length of the staff corresponds to a certain number of squares. This process is time consuming and demands professionally trained personnel. It is also possible as according to German Auslegeschrift 1,034,375 to first photograph a person and then, without moving the camera, to place a grid of given dimensions in place of the person and photograph the grid onto the same film. It is true that this process is more accurate than the preceding but it is still much too time consuming due to the double exposures necessary. According to British Patent Specification No. 687,737 one can photograph the person against a background provided with a grid in which the side of each square has a length of an arbitrarily chosen unit of length, e.g., 1 inch. The picture produced in this way is directly useable for measuring purposes. It is true that this process is quick, but it is marred by measuring errors which can be difficult to eliminate without knowledge of the distance between the person and the camera and the distance between the background and the camera. Even if these distances are known one cannot use the measuring results directly without conversion, which demands professionally trained personnel.

The invention is designed to provide a process and a device of the type mentioned in the introduction, with great accuracy, freedom from conversions, the least possible time consumption and the least possible demands on the professional ability of the personnel. This is achieved by taking those measures disclosed in the characterizing clause of claim 1. In the process and device according to the invention a graduated background is used with the graduation enlarged. The degree of enlargement is computed so that the correct dimensions can be read from the photographs directly with the help of the graduation in the photo, if the ratio of the distance between the background and the object (b) to the distance between the camera and background (a) always has a predetermined value. To fulfill this requirement it is suitable to make said distance constant and direct the camera and the object in relation to the background with the help of indicate marks. A graduated background with measures computed so that correct reading of the dimensions can be made in the center of the object from a chosen distance has the advantage that the object is clearly divided into different areas. Both the width and height dimensions are immediately visible by following the lines of the squares in towards the object after noting the numbers on the background. Such a quick estimate of dimensions is valuable, for example when a hospital patient has been photographed before and after a healing process, medication, growth disturbance etc. It is also possible to measure a part of a person or object with a ruler on the finished photograph. The ruler is then placed over the dimensions of the photograph and it is possible to read the ruler measure obtained in cm and dm.

If one wishes to know where the exact middle line is on the patient or the object at the moment of exposure, a thick black elastic string for example can be attached at right angles between the ceiling and the middle line 4b of the box. An extra camera then makes a picture, of the background seen from the side at the same time as the front side of the background is photographed. Such a side picture can then accompany the patient picture, giving information about the exact position for the measurements given. A measuring position check of this type is hardly necessary when photographing patients, but it can easily be done if so desired.

DETAILED DESCRIPTION OF THE INVENTION

Figure 1:
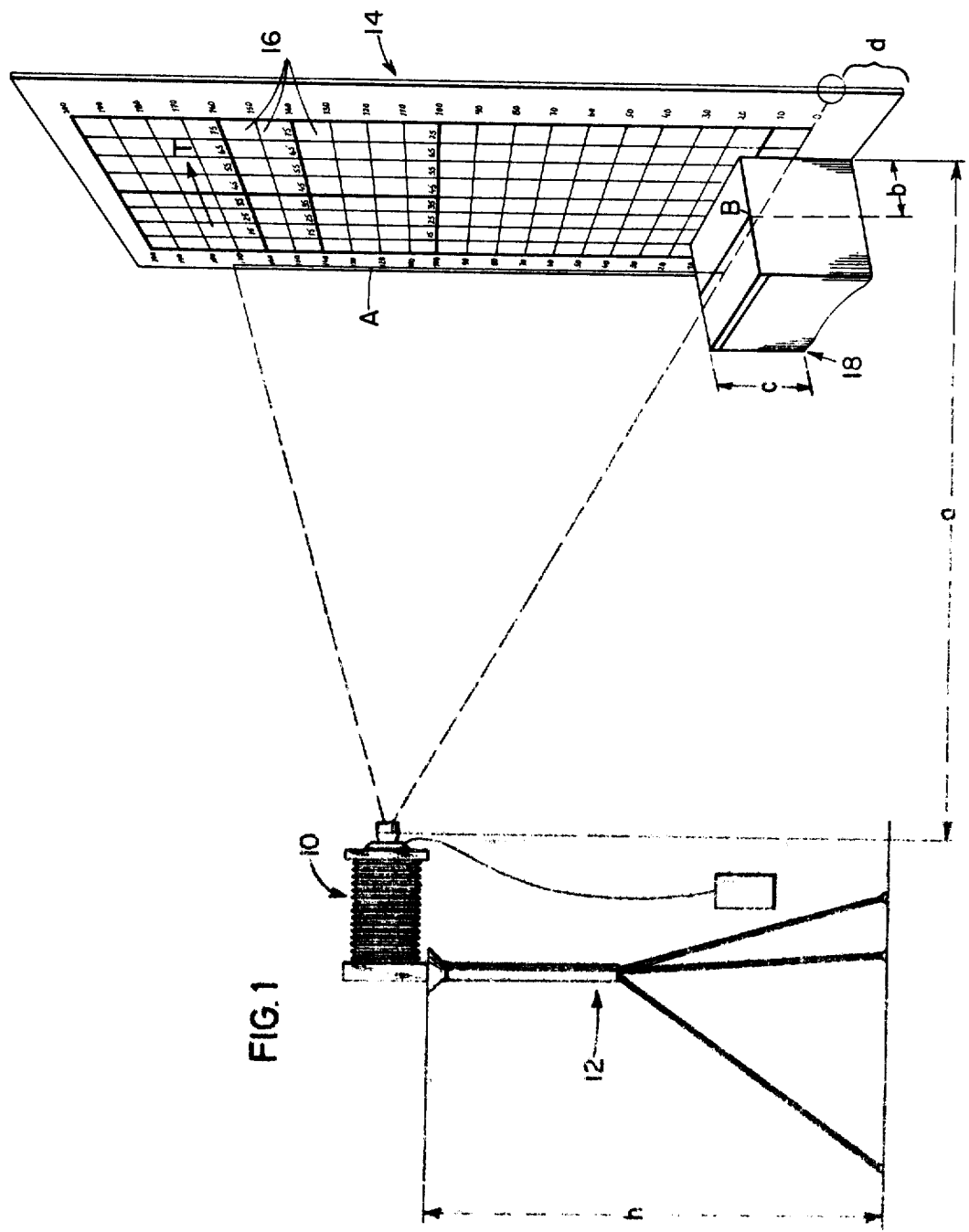
FIG. 1 is a diagrammatic perspective view of exemplary apparatus according to the present invention for photographically determining the dimensions of an object or person.
Figure 3:
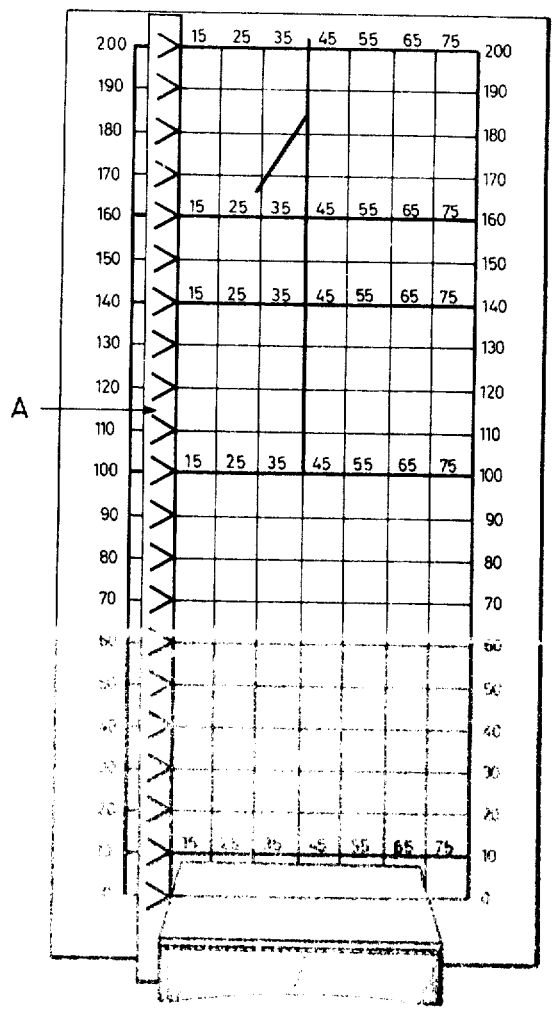
FIG. 3 is a frontal view of a background such as shown in FIG. 1 that may be used according to the present invention.

Reference is had to FIG. 1 of the drawings in which 10 is a camera mounted on a tripod 12 or the like, 14 is a photographic background provided with dimensions marked off in a grid-like arrangement, including squares 16, and 18 is a supporting surface for an object to be measured, preferably comprising a box that is adjustable in height. The distance of the camera 10 from the ground is given by $h$, the distance between the camera 10 from the background 19 is $a$, the height of the box 18 is $c$, the distance of the straight line indicator marking B on the top of box 18 from the background 14 is $b$, and $d$ is the height of the zero-reference straight-line marking O from the ground.

Figure 2:
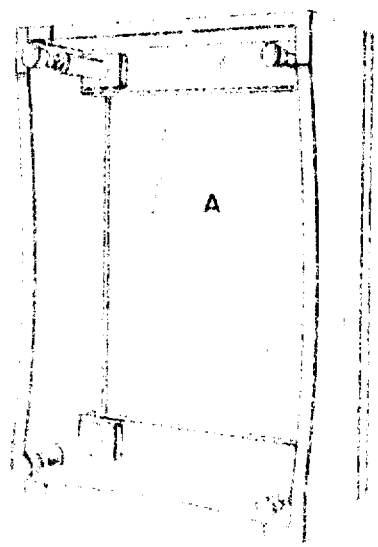
FIG. 2 is a detailed view of an exemplary object-supporting box, such as that shown in FIG. 1, that may be used according to the present invention.
Figure 4:
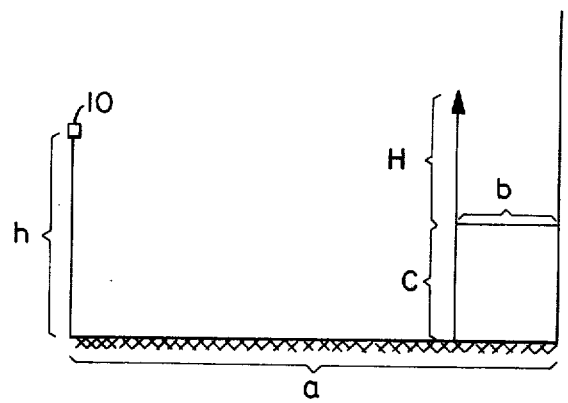
FIGS. 4–7 are supplementary schematic views showing the preferred relationships between various apparatus components for help in understanding the theoretical background of the present invention.
Figure 5:
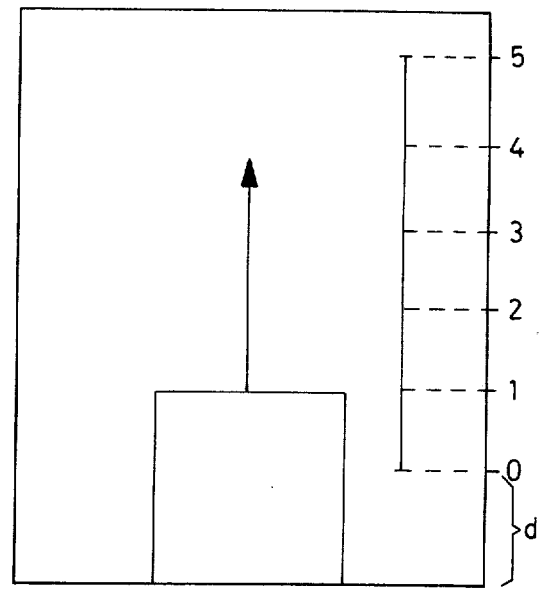

A person or object A to be photographed is placed on the box 18 so that a line from the camera 10 through the marking B on the box 18 top passes through the zero-reference line O. The distance $b$ of the line B from the background 14 and the distance of the person or object to be measured from the background are thus the same. H indicates the true height of the person or object, and L indicates the "projected" height of the person or object on background 19. A line passing from the camera 10 tangent to the top of a person or object to be measured intersects the background 14 at "headmark" T. The scale of the background 14 preferably is in decimeters, although any marking dimension is suitable, and is so arranged that a measuring rod 20 (see FIG. 2) placed on and vertically extending upwardly from the marking B on box 18 corresponds exactly to the markings on the background 14.

The letter $m$ indicates the size of the squares 16 along one of the sides thereof, and $R$ = the number of squares below $T$ on the background corresponding to the projected height of an object, so that $m \times R = L$.

Figure 6:
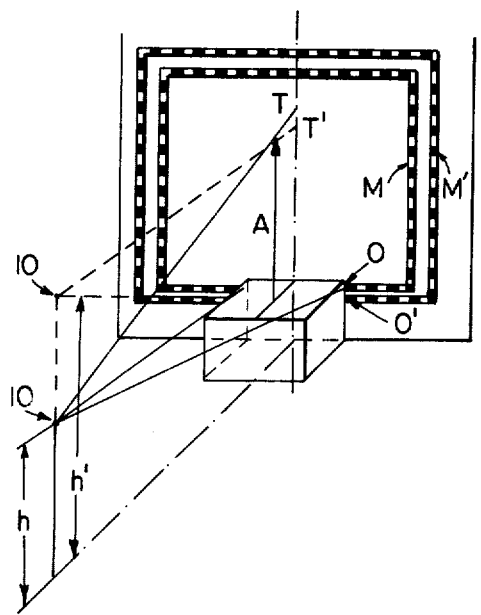
Figure 7:
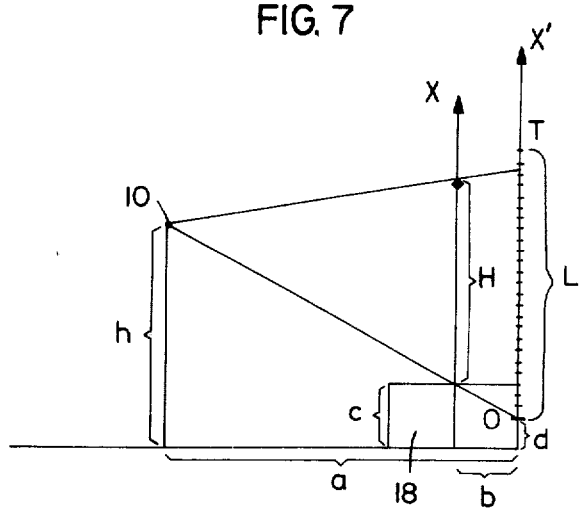

FIG. 6 illustrates the effect of adjusting the camera height $h$. In FIG. 6, $M$ is a measuring strip which relates to the height h of the camera 10 above the floor, and $A$ is the object to be measured. The 's indicate the situation wherein the camera 10 is raised from the position a distance $h$ off the ground to a distance $h'$.

Where the invention is to be used to provide a background from which all the dimensions of a person may be readily ascertained from merely looking at the picture (as is the normal situation) and the person's height is known, one may check an individual's posture by making sure that a line from the camera 10 to "headmark" T which corresponds to the "true" projected height of the person (measured by other means) is tangent to the person's head.

If a hospital procures a measuring background for photographing patients, an appropriate photographing distance is determined. For example, a background is adjusted to a 2 ½ $m$ camera distance. This distance is suitable both for large format cameras and small picture cameras. All negative material is photographed on the same scale, which is an advantage. If ring flash illumination is used even a hospital without a photographer can take pictures of patients. By having a given exposure distance all of the settings on the camera will be the same each time. The only thing the photographically untrained person has to do is aim the camera straight in relation to the background with the help of the camera level and the grided finder and make sure that the camera is in such a vertical position that the middle line of the background box (where the reading of the dimensions is done) and the lower horizontal line of the background coincide in the finder of the camera. The patient is placed on the background box with his mid-point between the middle line of the background box and the head marker. The head marker can run in a strip marked in centimeters, the cm marking beginning at the background box. The correct height dimension of the person can then be read on the background. This procedure can be necessary when children are photographed. A child can be shy during the picturetaking and cannot always be made to stand correctly on the background box. In order that the observer of the picture will be able to see if the measurement was done correctly, a horizontal black metal strip can routinely be attached to the background at the actual height of the person or object. If the person or object photographed does not reach up to this mark, then the viewer of the picture will know that the dimensions are not correct.

When the background is installed an ordinary wood strip with dm-marking is applied. This strip is placed vertically between the middle line of the background box and the head marking. When the dm-markings of the background and the dm-markings of the wooden strip are side by side in the finder of the camera, then the distance between the camera and the background is correct. It is also possible to vary the distance of the camera by moving the middle line of the background box and the head marking nearer to the camera. The head marking and the background box can also have two markings if two different camera distances are desired. Marks on the floor should be made for the distance of the camera tripod from the background to facilitate the picture-taking. This background can be hung in a very small room, and if a ring flash is used no permanent power source is necessary. In a hospital this means that the patient need not be moved to a photography studio, rather a background can be placed on each floor in, for example, a treatment room. It is desirable to have a background in those wards where patients should not be moved because of the risk of infection.

Pictures made at, for example, three different times during a healing process or when there is a disruption of growth, can be photographed together with a positive transparency. This transparency is quite suitable for instruction when projected on a wall. If a more detailed measurement is desired a transparent cm grid can be made with the same scale as the picture size used. The body or objects are then divided into cm squares, when the cm grid has been placed over the picture. If dm squares are desired over bodies or objects on a positive transparency, an empty background is photographed. This positive transparency is then fitted over the desired transparency when mounted so that the grids coincide. It should be pointed out that a trueto-scale grid, which has been placed over pictures of the background shows the dimensions of the body or object in cross section.

Producing a dimensionally correct background when the object, when photographed, stands at a certain distance from the background

FIG. 6

$h$ = height of camera above the floor
$H$ = height of the object from the background box
$l$ = height of the background box above the floor
$b$ = distance between the background and the object
$a$ = distance between the camera and the background
A unit of length on the object corresponds to $a/a-b$ times the unit of length of the background.

FIG. 7

If different scales are desired for practical reasons because of the different heights of the objects the zero points of the scales will be placed at different distances from the floor.

The distance between the scale and the floor, with the designations in FIG. 6 will be $(hb-al)/(b-a)$.

The easiest way of achieving this is to plot the units of length on the background from the same level as the object.

Specific case If $\begin{cases} b = 0.2 \ m \\ a = 2 \ m \end{cases}$ the transformation ratio will be $$\frac{2}{1.8} \quad \frac{10}{9}$$

One dm on the object corresponds to 1.111 dm on the background.

If
$$\begin{cases} b = 0.2 \ m \\ a = 3 \ m \end{cases}$$

the corresponding measure will be

15/14 dm (1.071 dm).

Error analysis

If the distances $a$ and $b$ have errors $\Delta a$ and $\Delta b$ respectively the error in each unit of length will be $$\frac{b}{(a-b)} 2\Delta a + \frac{a}{(a-b)} 2\Delta b$$

If one presupposes that the camera can be placed with great accuracy at the distance, e.g., 2 or 3 meters from the background, the error in measuring will be essentially dependent on how accurately one places the highest point of the patient or object at the distance $b$ (e.g. 2 dm) from the background.

If $b$ is quite a bit less than $a$ (as it is in the case where $a = 2\ m\ b = 0.2\ m$) we see that the error in measurement will be approx. $1/a\Delta b$.

If an accuracy of 1% is required in regard to this type of error the distance of the object from the background may vary by a maximum of 2 cm if $a = 2$ m and $b = 0.2$ m The above reasoning presupposes that the lens reproduces according to scale, i.e., it should be possible, without correcting the copy to photograph a chart dimensionally and angularly correct.

Mathematical description of the reproduction camera-object-measuring background See FIG. 9, with two parallel $x$-axes, $x$ and $x'$, both of which start at floor level.

That factor by which the dimensional units of the background (corresponding to centimeters) are to be multiplied to correspond to the dimensional units of the object (centimeters) will be $$\frac{a}{a-b} \qquad (1)$$

The distance from the floor from which the measuring band $M$ is to be plotted will be $$(ac-bh)/(a-b) \qquad (2)$$

The relation between the coordinates $x$ and $x'$ will be $$x = \frac{a-b}{a} x' + \frac{hb}{a} \qquad (3)$$

Furthermore
$$\begin{cases} x = L + c \ ..... & (4) \\ x' = d + m \cdot R \ ..... & (5) \end{cases}$$

We presuppose that there is a given square size and set the distance a which gives the dimension along the $x$-axis in centimeters. Set in (4) and (5) into (3)

$$1 = -c + \frac{a-b}{a}(d + m \cdot R) + \frac{hb}{a} \qquad (6)$$

We now have a formula which takes into account all the factors which need to be measured to find $l$.

If the squares on the background are enlarged in accordance with (1) and are displaced a distance $d$ in accordance with (2) from the floor one can by counting the number of squares from $N$ compute the actual length of the object B. Formula (6) can be used for an estimate of the maximum possible error since all of the dimensions $a,b,c,d,h,m$ and $R$ can only be determined to a certain degree of accuracy.

Usual differentiation gives us:

$$|\Delta l| \leq |\Delta c| + (1 - \frac{b}{a})|\Delta d| + \frac{b}{a}|\Delta h| + (\frac{Rm + d}{a} - \frac{h}{a})|\Delta b| + \frac{b(Rm + d) - hb}{a^2}|\Delta a| + R(1 - \frac{b}{a})|\Delta m| + (1 - \frac{b}{a})|\Delta R| \quad ..... (7)$$

$\Delta l, \Delta c, \Delta d, \Delta h, \Delta b, \Delta a, \Delta m, \Delta R$ are the factors of uncertainty in $l, c, d, h, b, a, m$ and $R$ respectively.

Note that we have not taken the abberation errors of the camera into account as they are assumed to be insignificant.

We will illustrate the formula (7) by inserting some conceivable values.

All dimensions and uncertainties are given in cm except for the number $N$ of units (squares on the background).

$a = 250 \pm 1$
$b = 20 \pm 2$
$c = 20 \pm 0.5$
$d = 17.4 \pm 0.5$ (distance $d$, when $a = 250$, $b = 20$, $h = 50$, $c = 20$)
$m = 1.087 \pm 0.0005$ (enlargement factor when $a = 250$, $b = 20$)
$R = 160 \pm 0.5$ (corresponds to a person 160 cm tall)
$h = 50 \pm 1$ When inserted we get:

$$|\Delta l| \leq 0.5 + (1 - \frac{20}{250}) \cdot 0.5 + \frac{20}{250} \cdot 1$$
$$+ (\frac{50}{250} - \frac{160 \cdot 1.087 + 17.4}{250}) \cdot 2 + \frac{20(160 \cdot 1.087 + 17.4) - 50 \cdot 20}{250^2} 1$$
$$+ 160 (1 - \frac{20}{250}) \cdot 0.0005 + 1.087(1 - \frac{20}{250})0.5 =$$
$$= 0.5 + 0.92 \cdot 0.5 + 0.08 \cdot 1 + 0.52 \cdot 2 +$$
$$+ 0.04 \cdot 1 + 147 \cdot 0.0005 + 0.93 \cdot 0.5 = 2.66 \ (cm)$$

We see that the error in the height to a negligible extent consists of errors from $h$, $a$ and $m$; the last error being negligible provided that the squares on the measuring band be identified with sufficient accuracy.

Above all one must be able to control the errors in $c$, $d$ and $b$.

If we compare the accuracy of this method with the alternative of placing the object right next to the wall against an ordinary measuring band the major error will be from $R$, which would give an error in $l$ of approx. 0.5 cm according to the numerical values above. In addition to this there is a not completely negligible error which is due to the fact that the highest point of the object is not precisely against the screen. If the camera is lower than the object its actual height will be somewhat less than that given by the measuring band. This is more easily controlled in the method above if one can merely give the distance from the background to the highest point of the object ($=b$ in FIG. 9) with sufficient accuracy (in the example above with a tolerance of 2 cm).

It is also useful to establish the statistical aspects of how all the errors combine. If one uses the standard error (standard deviation) the corresponding formula will be $$S_l^2 = S_c^2 + (1 - \frac{b}{a})^2 S_d^2 + (\frac{b}{a})^2 S_h^2 + (\frac{Rm+d-h}{a})^2 S_b^2$$
$$+ (\frac{b(Rm+d)-hb}{a^2})^2 S_a^2 + (P(1 - \frac{b}{a}))^2 S_m^2$$
$$+ (m(1 - \frac{b}{a})^2)^2 S_R^2 \quad \ldots (3)$$

in which the quantities $l, c, d, h, b, a, m$ and $R$ are now assumed to be stockastic variables with the average values zero and the standard deviations $S_l$, $S_c$, $S_d$, $S_h$, $S_b$, $S_a$, $S_m$ and $S_R$.

If one assumes that the uncertainties in the numerical example are standard deviations the standard deviation in $l$ will be $$S_l \approx \sqrt{0.5^2 + 0.92^2 \cdot 0.5^2 + 0.08^2 \cdot 1^2 + 0.52^2 \cdot 2^2}$$
$$\overline{+0.04^2 \cdot 1^2 + 147^2 \cdot 0.0005^2 + 0.93^2 \cdot 0.5^2} \approx \sqrt{1.73}$$
$$\approx 1.3$$

If this aspect is applied to the combined effect of the errors the methods will be essentially equivalent as regards accuracy.

What I claim is:

1. Apparatus for producing images of an object for measuring purposes comprising a plane gackground surface provided with a scale or grid, the divisions of the scale of the sidelength of an individual square in the grid being the unit length in which the object is to be measured, multiplied by the ratio between the distance between the camera and the object, a supporting surface for the object, which is provided with a straight line indicator marking for placement of the object and/or camera, and a straight line indicator marking on the background surface, wherein the camera and the supporting surface can be set so that the straight line indicator markings are parallel when photographed.

* * * * *

UNITED STATES PATENT OFFICE
CERTIFICATE OF CORRECTION

Patent No. 3,902,182　　　　　　　　　Dated August 26, 1975

Inventor(s) Lars Evert Bernhard Hillborg

It is certified that error appears in the above-identified patent and that said Letters Patent are hereby corrected as shown below:

In claim 1, line 2 should read:

--measuring purposes comprising a plane background--;

In claim 1, line 7 should read:

--between a camera and the background surface and the distance between the camera and the object, a supporting sur- --.

Signed and Sealed this

*second* Day of *March 1976*

[SEAL]

Attest:

RUTH C. MASON
*Attesting Officer*

C. MARSHALL DANN
*Commissioner of Patents and Trademarks*